July 16, 1935.  S. W. BURNHAM  2,008,001
RECEPTACLE CLOSURE
Filed Dec. 28, 1934
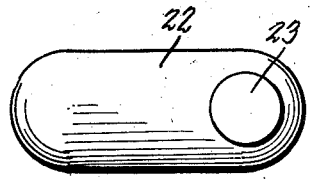
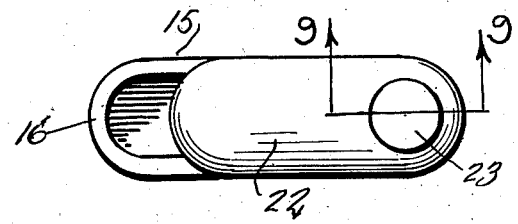
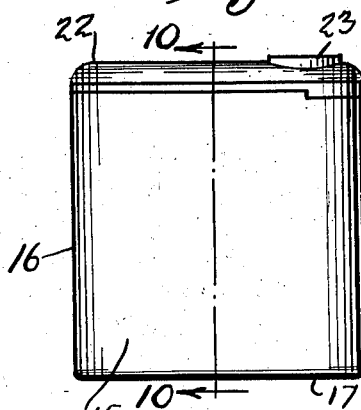
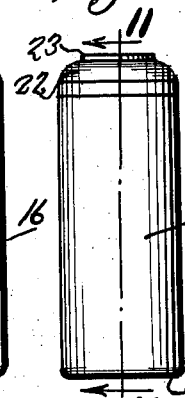
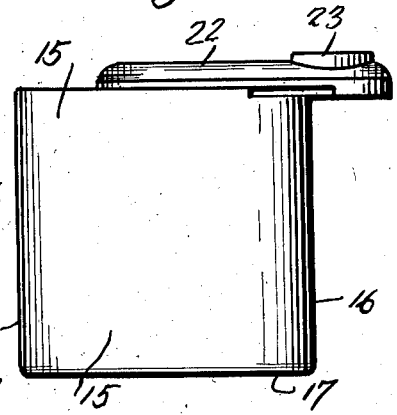
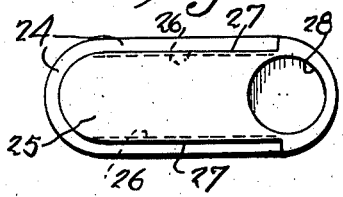
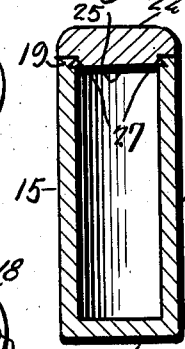
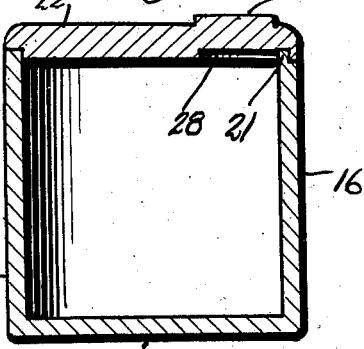
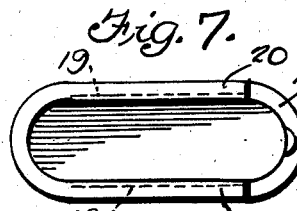
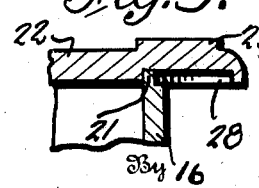
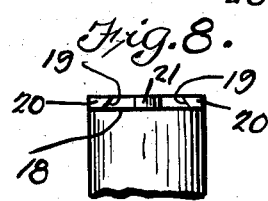
Inventor
Stanley W. Burnham
By Charles A. Davies
Attorney Patented July 16, 1935

2,008,001

UNITED STATES PATENT OFFICE 2,008,001

RECEPTACLE CLOSURE

Stanley W. Burnham, Elizabeth, N. J., assignor to Merck & Co., Inc., Rahway, N. J., a corporation of New Jersey Application December 28, 1934, Serial No. 759,473

2 Claims. (Cl. 206—42)

This invention relates to certain new and useful improvements in receptacle closures.

The primary object of the invention is to provide a restricted opening in a receptacle for single delivery of pills, tablets, etc.

This object and other objects ancillary thereto which will become apparent from a study of the following description, I accomplish by means of the device illustrated in the accompanying drawing, in which Figure 1 is a top plan view of a container constructed in accordance with the present invention;

Figure 2 is a top plan view with the sliding closure for the container in open position;

Figure 3 is a side elevational view;

Figure 4 is an edge elevational view;

Figure 5 is a side elevational view with the sliding closure in opened position;

Figure 6 is a bottom plan view of my container with the closure means removed from the container, and showing the movement limiting means;

Figure 7 is a top plan view of the container body with the closure means removed, and showing the cooperating means of the container body and the closure;

Figure 8 is a fragmentary and elevational view of the container;

Figure 9 is a detail sectional view taken on line 9—9 of Figure 2;

Figure 10 is a vertical sectional view taken on line 10—10 of Figure 3; and

Figure 11 is a vertical sectional view taken on line 11—11 of Figure 4.

Referring more in detail to the accompanying drawing, there is illustrated a receptacle or container for pills, tablets, or the like, preferably of "vest pocket" size, which may be constructed of any desired material, and which is provided with a sliding closure by means of which a restricted opening in one end of the receptacle is provided for single delivery of the pills, tablets, etc. The container comprises parallel side walls 15 merging into curved end walls 16, and a bottom wall 17, and is open at its upper end for the reception of a sliding closure. The upper edge of the container is cut away at one end, as at 18, and the opposite sides at the upper edge of the side walls 15 are undercut, as at 19, to provide a pair of guide ribs 20 cooperating with similarly formed guide ribs on the sliding closure. The stop lug 2 rises from the cut-away portion 18 at the upper end of one of the end walls 16 for cooperation with the sliding closure.

The sliding closure 22 is so proportioned with relation to the body of the container as to present its marginal edges flush with the side and end walls of the container, when in closed position. To facilitate its movement the sliding closure means is provided at one end with a raised disk projection 23. The inner face of the closure 22 has the marginal edge thereof cut away as at 26, and as shown by dotted lines in Figure 6, to provide guide ribs 27 cooperating with the guide ribs 20 of the open upper edge of the container. A circular depression 28 is formed in the block projection 25 at the end opposite the cut away portion 24, into which the stop lug 21 extends, as shown in Figures 9 and 11.

The walls of the container are sufficiently resilient to permit placement of the sliding closure in operative position on the container body. When thus placed, the sliding closure is permitted limited sliding movement relative to the container body to expose the interior of the container at one end thereof for the discharge of single tablets from the container as illustrated in Figure 2.

The abutment lug 21 extends into the circular depression 28 of the sliding closure, and the latter is limited in its opening movement by the stop lug 21 engaging a side wall of the depression 28. Closing movement of the sliding closure is also limited by the stop lug 21 engaging the side wall of the depression 28 opposite the side which engages the lug 21 to define the opening movement. Closing is also limited by engagement of the block projection 25 of the sliding closure 22 with the inner face of the upper end wall of the container, as shown in Figure 11, the sliding closure being guided in its movement by the co-acting guide ribs on the container body and sliding closure. Operation of the closure 22 is facilitated by the disk projection 23 rising from one end thereof.

From the above detailed description of a preferred embodiment of my invention, when read in connection with the accompanying drawing, it will be apparent that certain modifications may be made therein without departing from its scope. The invention, therefore, is not to be limited except as necessitated by the state of the prior art and the spirit of the appended claims.

I claim as my invention:

1. A container comprising a body portion open at its upper end, a sliding closure for the open end, cooperating guiding ribs on the body and closure, and cooperating means carried by the body and closure for limiting sliding movement of the closure on the body, said last-named means comprising a stop lug rising from the upper end of the body and a depression in the under side of the cover, into which the stop lug extends and against a side wall of which it abuts.

2. A container comprising a body portion open at its upper end, a sliding closure for the open end, the open end of the body portion being cut away at one end to provide upstanding ribs at opposite sides, said ribs being undercut to form guides, a stop lug rising from the cut-away portion of the open upper end, a block projection on the inner face of the sliding closure having opposite sides undercut to form guide ribs adapted for slidable engagement with the guide ribs on the body portion, and a depression in the bottom face of the closure into which the stop lug extends for engagement with opposite walls of the depression for limiting sliding movement of the closure on the container.

STANLEY W. BURNHAM.